US005186300A

United States Patent [19]

Zaharia

[11] Patent Number: 5,186,300

[45] Date of Patent: Feb. 16, 1993

[54] STARTING CIRCUIT AND METHOD FOR ESCALATORS AND MOVING WALKS

[75] Inventor: Vlad Zaharia, Rocky Hill, Conn.

[73] Assignee: Otis Elevator Company, Farmington, Conn.

[21] Appl. No.: 909,373

[22] Filed: Jul. 6, 1992

[51] Int. Cl.[5] .......... B65G 15/00

[52] U.S. Cl. .......... 198/322; 198/323

[58] Field of Search .......... 198/322, 323

[56] References Cited

FOREIGN PATENT DOCUMENTS 0091282 10/1978 Japan .......... 198/323

1265130 10/1986 U.S.S.R. .......... 198/322

*Primary Examiner*—Joseph E. Valenza

*Assistant Examiner*—Cheryl L. Gastineau

*Attorney, Agent, or Firm*—Francis J. MaGuire; Richard D. Getz

[57] ABSTRACT

An improved keyswitch circuit for an escalator or moving walkway senses the normal (center or lateral) position of the keyswitch and, if the keyswitch does not return to its normal position after a selected event such as a selected normal starting interval, then the safety circuit is opened and the escalator or moving walk is stopped; the escalator or moving walkway can be restarted only after first returning the keyswitch to its normal position.

10 Claims, 3 Drawing Sheets

STARTING CIRCUIT AND METHOD FOR ESCALATORS AND MOVING WALKS

TECHNICAL FIELD

This invention relates to escalators and moving walks and, more particularly, to safety circuits therefor.

BACKGROUND OF THE INVENTION

Escalators and moving walks are equipped with starting keyswitches located at both ends. The keyswitches have two starting positions, typically lateral, for the up and down directions (in the case of escalators) and for forward and reverse (in the case of moving walks), and a spring return to a normal (center) position.

To start the escalator or moving walk, one of the keyswitches is turned to one of the starting positions, e.g., up or down, forward or reverse. After the direction circuit is latched or "sealed-in", the keyswitch is released to the normal position and the key may be removed.

DISCLOSURE OF INVENTION

It is possible that the keyswitch may become blocked in one of the starting positions. While this would not affect the normal operation, it is a potential problem in the event of a safety condition opening the safety chain momentarily or for a longer period.

When a safety device operates, it opens the safety circuit or chain, which in turn stops the escalator or moving walk. The escalator or moving walk should only be able to be restarted with the keyswitch. But, with the keyswitch blocked in the starting position, the escalator or moving walk may start to run again after the disappearance safety condition which caused the stop. This would be particularly a problem, not only for the case when a safety device operates in a momentary fashion (to only temporarily open the safety chain) but also for the case where a mechanic fixes the problem which caused the safety chain to open. The serviceman might not be aware of the problem with the keyswitch and, after fixing the safety problem, the escalator could startup again on its own.

It is therefore an object of the present invention to provide enhanced safety for elevators and moving walks.

According to the present invention, improved safety for elevators and moving walks is achieved by checking the starting keyswitch at some point after startup, for example, after a selected time or after a selected benchmark such as the escalator or moving walk achieving running speed, and if the keyswitch has not returned to its normal position, then the safety circuit is opened and the escalator or moving walk is stopped and cannot be restarted until first returning the keyswitch to its normal position.

According further to the present invention, an improved keyswitch circuit senses the normal (center or lateral) position of the keyswitch. If the keyswitch does not return to its normal position after a selected normal starting interval (e.g., approximately ten seconds), then the safety circuit is opened and the escalator or moving walk is stopped. The escalator can be restarted only after first returning the keyswitch to its normal position.

In further accord with the present invention, the starting keyswitches at each end of a moving walk or at the lower and upper landings of an escalator have two poles consisting of, for example, one pole with two normally open contacts which are open when the switch is in the center position and one of which is selected by clockwise or counterclockwise rotation of the key, and an additional pole with two normally closed contacts which are closed when the switch is in the center position and open when in either the clockwise or counterclockwise positions; and an off delay timer relay that is energized when the starting keyswitch is in the center position. If the switch does not return to the center position within a selected (preset) period of time T, then the timer relay opens the safety circuit, thus stopping the escalator. This circuit does not allow the escalator or moving walk to restart if the keyswitch is not centered. It also stops the escalator or moving walk when the faulty condition is detected.

It should be realized that many alternate implementations are possible as shown by an additional example below; still others are of course possible and well within the scope of the invention.

These and other objects, features and advantages of the present invention will become more apparent in light of the following detailed description of a best mode embodiment thereof, as illustrated in the accompanying drawing.

BEST MODE FOR CARRYING OUT THE INVENTION

Figure 1:
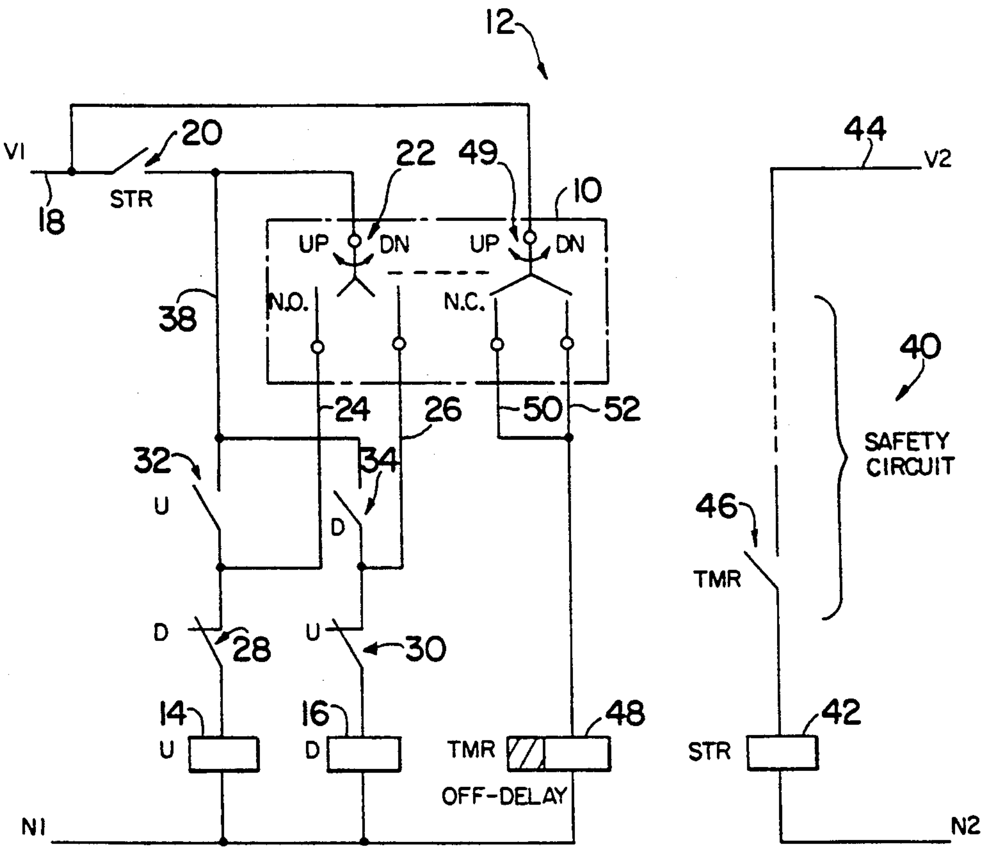
FIG. 1 is an illustration of a simplified starting circuit, according to the present invention.

FIG. 1 shows a starting keyswitch 10 which may be used at either end of an escalator for starting the escalator up or down by means of a key which is inserted in the switch 10 and rotated clockwise or counterclockwise, depending upon the desired direction of travel. The keyswitch 10 is connected into a circuit 12 having the function of energizing a coil in an up relay 14 or a coil in a down relay 16 by connecting a source voltage on a line 18 through a safety chain relay contact 20 (which is closed when the safety chain is made) and through a first pole 22 of the keyswitch 10. As shown, the pole 22 has three positions including a center position in which the voltage on the line 18 is not provided to either one of two lines 24, 26 and two other positions including an up position in which the voltage on the line 18 is connected to the line 24 and the down position in which the voltage on the line 18 is connected to the line 26. By holding the keyswitch in either the up or down position for a momentary period, the voltage on the line 18 is delivered through either a normally closed down contact 28 or a normally closed up contact 30 for energizing one or the other of the up and down relays 14, 16.

While one of the relays 14, 16 is thus momentarily energized by the keyswitch pole 22, an associated one or the other of a normally open UP contact 32 or a normally open DOWN contact 34 will be closed in order to latch or seal-in the relay 14 or 16 momentarily energized by the keyswitch. In this way the key may be released and the up or down relay 14 or 16 will remain energized and the escalator will continue to run.

As mentioned above, it is possible for the keyswitch pole 22 to become stuck in the up or down position such that the switch does not return to the center position and voltage is still supplied to either one of the lines 24, 26. In that event, if a safety condition occurs, the safety contact 20 will open in an attempt to deenergize the up or down relay 14 or 16, by removing voltage from a line 38, and voltage will also be removed from the pole 22 of the switch 10; but since the switch 10 is stuck, it will then be in a position to start the escalator up or down again without having to be first turned to the start position after the contact 20 closes again (when the safety chain fault is cleared).

Referring to the right-hand side of the illustration of circuit 12 in FIG. 1, there is shown a safety circuit 40 which typically comprises a series chain of safety contacts, all of which must be made (closed) in order to energize a relay STR 42 by means of a voltage on a line 44. Included among the contacts of the safety chain 40, according to the present invention, is a TMR contact 46 being associated with the relay TMR 48 in the left-hand side of the circuit 12 which constitutes an off-delay timer relay which, when energized, keeps the TMR contact 46 and the safety chain 40 closed to enable the safety chain to be made. The TMR relay 48 is energized by the voltage 18 which first passes through a second pole 49 of the keyswitch 10 which is ganged to the first pole 22. It is noted that the first pole may be a normally open switch and the second pole 49 may be a normally closed switch as shown. This means, for the illustrated embodiment, that the center position of the pole 49 causes both legs 50, 52 of the pole to be in contact with the voltage on the line 18, thus energizing the coil of relay 48. Only when the keyswitch 10 is moved to either the up or down position does the relay 48 become deenergized. Immediately upon becoming deenergized, the relay 48 starts timing until a preselected period has elapsed. If it is still deenergized after the period elapses, then the contact 46 is opened.

Assuming the keyswitch would normally be held in the up or down position for only about a few seconds and, for the sake of selecting an example, not more than ten seconds, the timer off delay may be set to some convenient time such as ten seconds within which it should be expected to be re-energized by the pole 48 being returned to the center position. In other words, even though the relay 48 has been deenergized by the switch 10 being moved away from the center position, the contact 46 will remain closed in the safety chain until the timer times out, i.e., for ten seconds. If the keyswitch does not return to the center position and thus does not re-energize coil 48 the timer will time out and the contact 46 will open and it will be impossible to run or restart the escalator. In other words, the STR contact 20 will not close because the TMR contact 46 is open due to the keyswitch 10 being blocked in either the up or down position.

Figure 2:
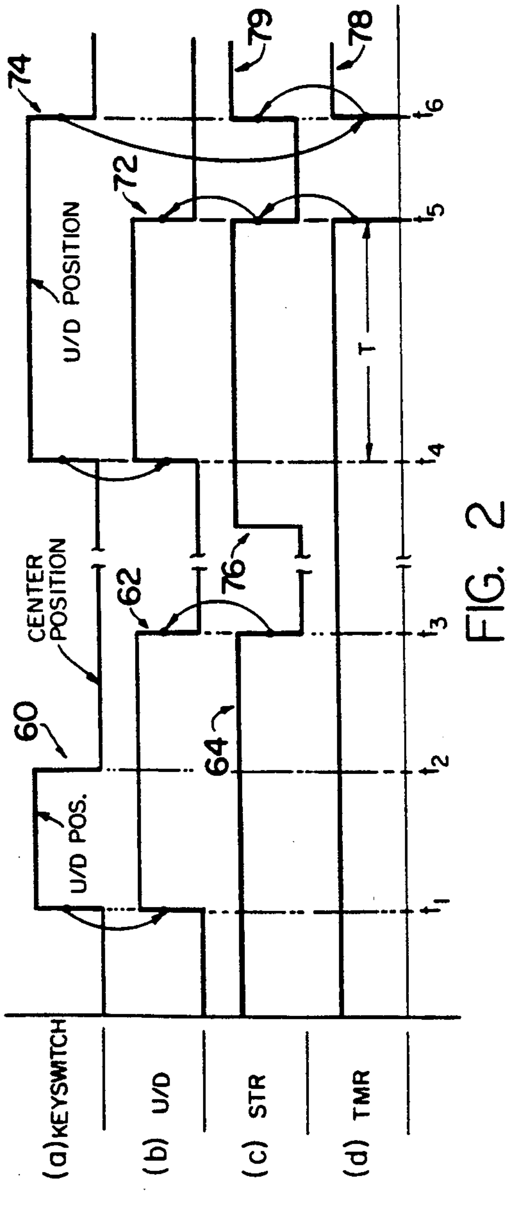
FIG. 2 is a simplified timing diagram showing the operation of the circuit of FIG. 1.

FIG. 2 shows the above described sequence of events by means of four separate waveforms sharing a common time line. FIG. 2(*a*) shows a waveform 60 which is intended to illustrate the keyswitch 10 being moved to the up or down position at a time $t_1$ and returning to the center position a time $t_2$ a few seconds later. As shown in FIG. 2(*b*) by a waveform 62, the up or down relay 14 or 16 will become energized at the time $t_1$ and will be sealed-in by one or the other of the contacts 32, 34 and keep the relay coils 14 or 16 energized even after the keyswitch returns to the center position, as shown by the waveform 62 persisting in the energized state even after time $t_2$. If, with a normally operating keyswitch, as illustrated by the waveform 60, the safety circuit 40 then experiences a safety condition causing the relay 42 to become deenergized, as shown in FIG. 2(*c*) by a waveform 64 at a time $t_3$, the up or down relay 14 or 16 will become deenergized as shown by the waveform 62 returning to the deenergized position at the time $t_3$. During all of this time, the contact 46 remains closed because the timer relay 48 has not had a chance to time out since the period during which power was removed from the relay 48 was not greater than a period T which may be assumed to be about ten seconds, more or less.

Subsequently, if the keyswitch is again operated to start the escalator, as shown at a time $t_4$, and one or the other of the up or down relays 14 or 16 are again energized, as indicated by a waveform 72 at a time $t_4$, and if the keyswitch becomes stuck in the up or down or, forward or reverse position, as indicated by a waveform 74 persisting for longer than the period T shown in FIG. 2(*d*), the TMR relay will cause the TMR contact 46 to open because it has not been reenergized due to the keyswitch 10 being stuck. Thus, at a time $t_5$ the safety chain will open and the STR contact 20 will open, as indicated at the time $t_5$ by a waveform 76. Similarly, the waveform 72 indicates that either the up or down relay 14 or 16 has become deenergized at the time $t_5$ and the escalator will stop. Assuming that, at a time $t_6$, the keyswitch is corrected and returns to the center position, the relay TMR 48 becomes reenergized as indicated by a waveform 78 in FIG. 2(*d*) and the safety chain may again be energized, as indicated by a waveform 79 of FIG. 2(*c*) at the time $t_6$. At that point, the escalator may be restarted, by means of the properly operating keyswitch.

Figure 3:
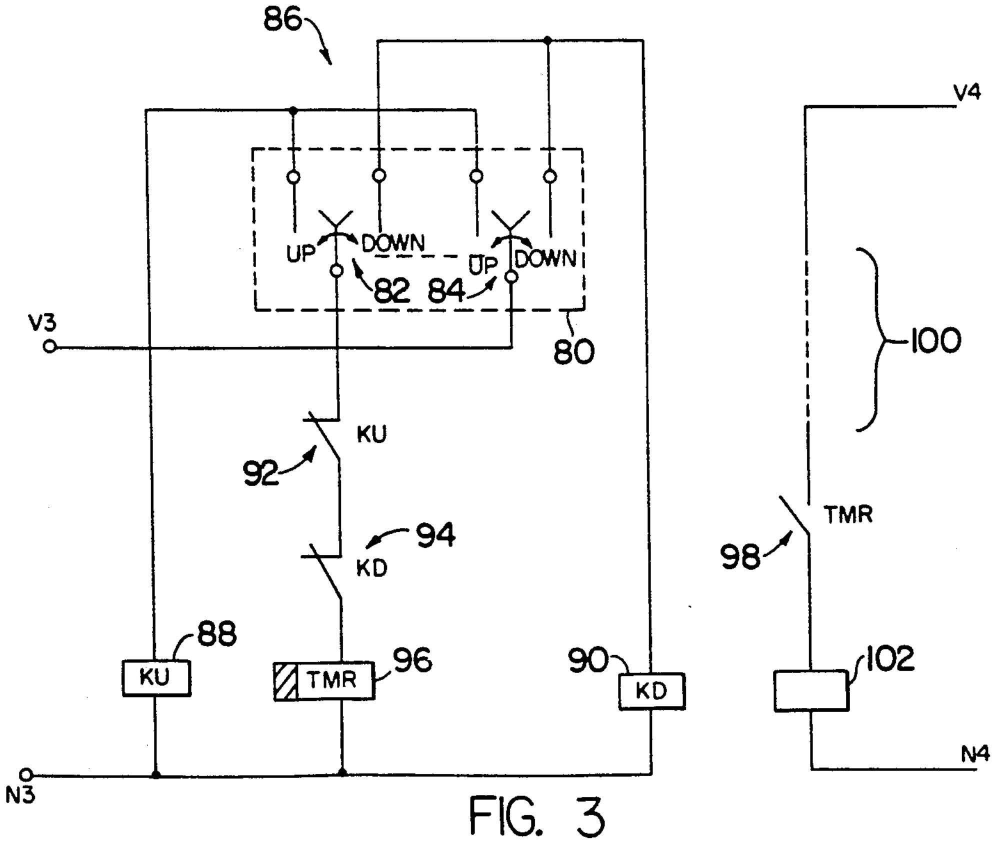
FIG. 3 shows a alternate starting keyswitch configuration embodiment, according to the present invention.

Of course, it should be realized that the concept of the present invention can be embodied using many different conceivable types of hardware which can equally well be wired in many different ways, including ways different from that shown in FIG. 1. For example, as shown in FIG. 3, a double pole center return switch 80 has both poles 82, 84 set up so as not to provide any circuit making path in the center position. It is utilized in a circuit 86 in which a keyswitch rotation in either the up or down direction will energize either a KU relay 88 or a KD relay 90 causing an associated normally closed contact 92 or 94, respectively, to open. In this way, a normally energized off delay relay 96 starts timing out in order to make sure that the keyswitch 80 returns to the center position within the time-out period. If it doesn't, a normally open contact 98 in a safety chain 100 will open and deenergize a safety chain relay 102, causing the keyswitch 80 to be ineffective for starting the escalator (by means of circuitry not shown). It will be realized that the KU and KD relays 88, 90 have additional associated contacts in the rest of the starting circuit of the escalator which is not shown. These will be ineffective until the keyswitch 80 is returned to the center position to allow the KU and KD relays 88, 90 to become deenergized thereby energizing TMR relay 96 which opens the TMR contact 98.

As another example, it is conceivable that a designer might carry out a circuit similar to that shown in FIG. 1 or FIG. 3 using an on-delay timer. As previously alluded to, it is not even necessary to use a timer at all. It is only necessary to pick some period or event occurring after startup which would serve the same purpose as a timer. For example, it could be that one could sense or determine that the escalator or moving walk has reached some selected sequence of events that occur after startup and then check whether or not the keyswitch has returned to the normal position. Such an event might be the escalator or moving walk achieving running speed, for example.

Figure 4:
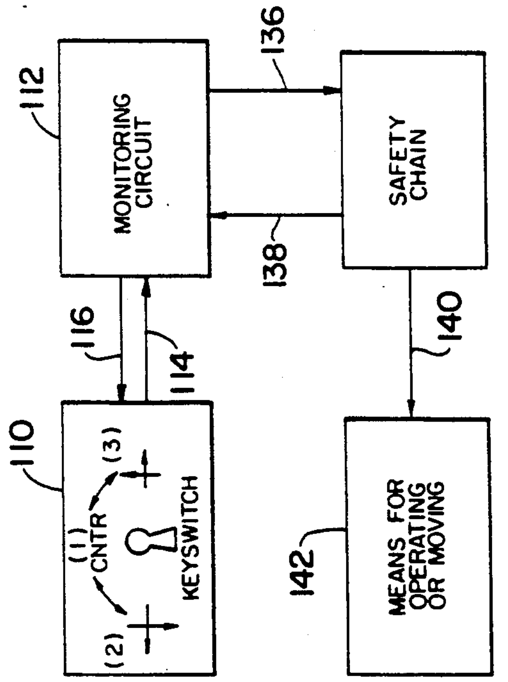
FIG. 4 shows a monitoring circuit, according to the present invention, for monitoring a keyswitch.

Referring now to FIG. 4, a keyswitch 110 is shown having a center position and a left or counterclockwise position and a right or clockwise position. The center position (1) is the normal position since turning to one of the other two positions is spring returned to center. The left position (2) may, for example, be to move a walkway in the left direction or an escalator in the down direction. Similarly, the right position might be to move an escalator up or a walkway to the right. It should be realized that the keyswitch 110 shown in FIG. 4 could be arranged differently with different orientations, orderings, normal positions, etc. It is not even necessary for the switch to be actuated by a key. It could simply be a switch of some kind having a normal position and at least one starting position.

A monitoring circuit 112, according to the present invention, is interconnected or may be responsive to the keyswitch 110. For example, the monitoring circuit 112 may be responsive to a signal on a line 114 from the keyswitch indicative of whether or not the keyswitch is in the normal (e.g., center) position, or that it is out of the normal position or that it is in one of the other positions. An interrogation signal on a line 116 may or may not be provided from the monitoring circuit to the keyswitch in order to receive back the signal on the line 114. On the other hand, the keyswitch may be arranged to provide the signal on the line 114 by itself. In any event, the monitoring circuit 112 checks the status of the keyswitch, as indicated by a step 118 in a series of steps 120 shown in FIG. 5 beginning with a step 122 which, in general, indicates that the series of steps 120 begins at some point. The step 118 may occur immediately after starting. The series of steps 120 also conclude at a step 124.

A step 126 is next executed in which a determination is made by the monitoring circuit 112 as to whether or not the keyswitch is out of the center position. As indicated previously, the method may instead detect other similar conditions of the keyswitch such as whether or not it is in one of the other positions or whether it is in the center position or in one of the in-between transition positions. If it is not out of the center position, the step 118 is again executed. If it is determined to be out of the center position, a step 128 is next executed in which a timing process is commenced to find out how long the switch remains out of the center position. To make this determination, a step 130 is next executed in order to determine whether or not the switch has been out of the center position for more than a selected period. If it has not, a determination is next made in a step 132 as to whether or not it is still out of the center position. This may be done by checking again the status of the signal on the line 114. If it is determined still to be out of position, the step 130 is again executed. If it is determined not to be out of the center position anymore, the step 118 and the following step 126 are again executed repeatedly until the status of the keyswitch is again determined to be out of the center position.

If the step 130 determines at some point that the switch has been out of the center position for more than a selected period, then a step 134 is next executed in which the monitoring circuit provides a signal to the safety chain, as indicated generally in FIG. 4 by a signal on a line 136 provided from the monitoring circuit to the safety chain. It should be realized that the monitoring circuit can provide this signal independently to the safety chain or there can be some interchange of signals between the safety chain and the monitoring circuit as indicated by an additional signal line 138 which may or may not be provided.

Figure 5:
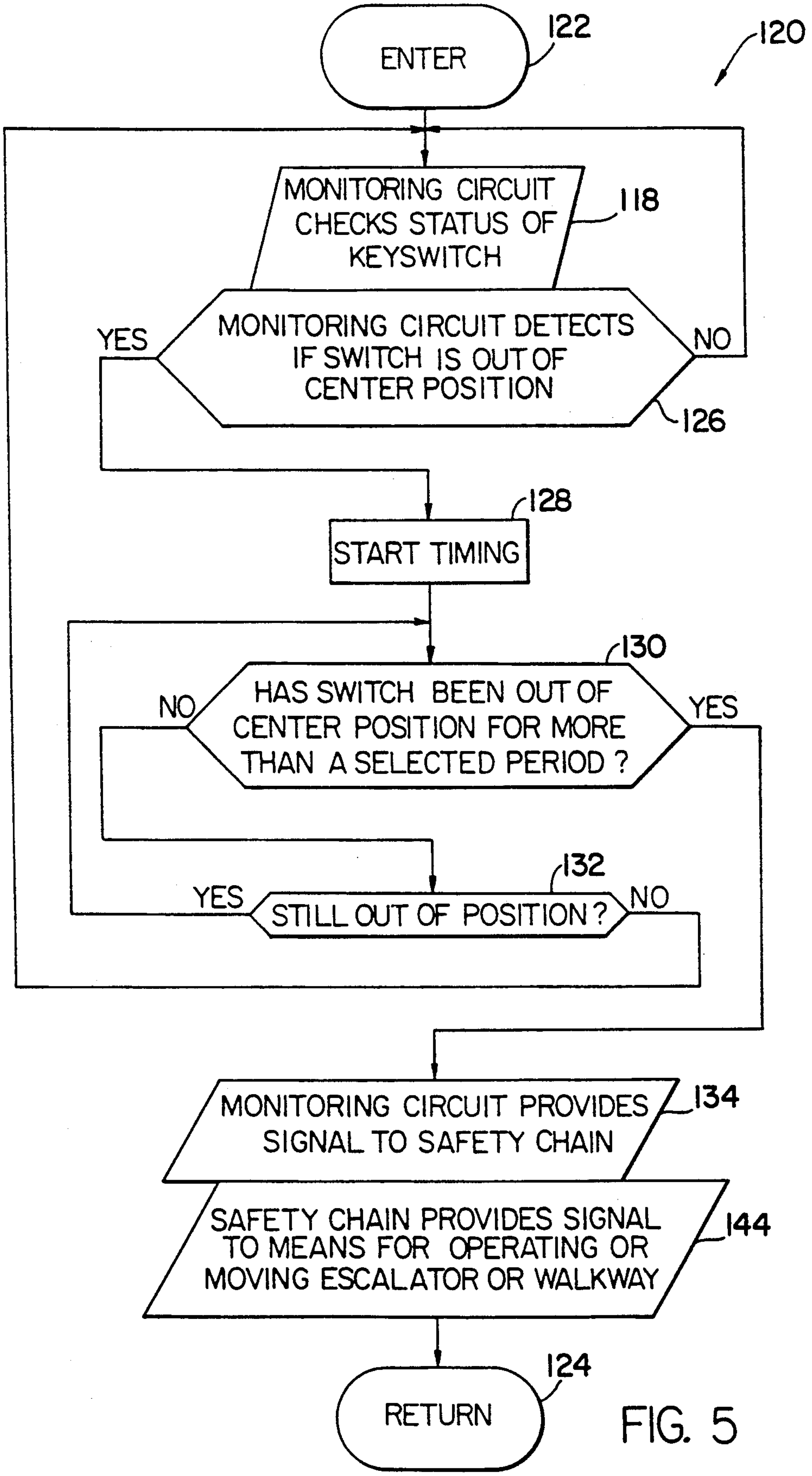
FIG. 5 shows a method, according to the present invention, for monitoring a keyswitch.

In any event, when the safety chain receives the signal on the line 136 from the monitoring circuit, it opens the safety chain and, as a result, the safety chain effectively sends a signal on a line 140 to a means 142 for operating or moving the escalator or moving walkway as indicated generally by a step 144 in FIG. 5.

It should be realized that the flow chart of FIG. 5 is particularly adapted for the case where a timing relay 48 or 96 as shown in FIGS. 1 and 3 is used. However, as explained previously, it is not necessary in practicing the invention to use a timer relay. If, as explained above, it is desired to select some other sequence of events such as the escalator or moving walk achieving running speed, the steps in FIG. 5 involving the start of timing and the duration thereof meeting a failure criteria as shown for example in steps 118, 126, 128, 130 and 134, all of these would be replaced by simply a step 118 checking the status of the keyswitch after the selected event and leaving out step 128 and determining in a combined step 126, 130 whether or not the switch is out of the normal position and, if so, providing a signal, as in step 134, to the safety chain for stopping the escalator. The step 132 would also be left out.

Although the invention has been shown and described with respect to preferred embodiments thereof, it should be understood that the foregoing and various other changes, omissions and additions may be made therein without departing from the spirit and scope of the invention.

I claim:

1. A method for checking a startup switch for an escalator or moving walkway, comprising the steps of:
   - determining that a selected post-startup event has occurred;
   - checking that the keyswitch has returned to a normal position; and
   - providing a permissive signal for permitting the escalator or moving walkway to continue to operate.

2. Apparatus for checking a startup switch for an escalator or moving walkway, comprising:
   - means for determining that a selected post-startup event has occurred;
   - means for determining after the event has occurred that the keyswitch has returned to a normal position; and
   - means for providing a permissive signal for permitting the escalator or moving walkway to continue to operate in the event it is determined the keyswitch has returned to a normal position.

3. Apparatus for an escalator or moving walkway having a keyswitch having a normal position and one or more start positions for starting operation in one or more directions, respectively, comprising:
   - a monitoring circuit, responsive to a signal indicative of the keyswitch being in or out of the normal position, for providing an indication signal that the keyswitch is in the normal position or has been out of the normal position for less than a selected period; and a safety chain, responsive to the indication signal from the monitoring circuit, for permitting the escalator or moving walkway to start or operate.

4. The apparatus of claim 3, wherein the keyswitch has a normally closed pole and wherein the monitoring circuit has a timer relay connected to the normally closed pole for being energized in the normal position and for timing each period in which the normally closed pole is out of the normal position and for providing the indication that the keyswitch is in the normal position or has been out of the normal position for less than the selected period.

5. The apparatus of claim 4, further comprising first and second direction relays and wherein the keyswitch also has a normally open pole for momentarily energizing one or the other of the up and down relays for starting the escalator or moving walkway.

6. The apparatus of claim 3, wherein the keyswitch has two ganged poles and wherein the monitoring circuit has a timer relay connected in series with a pair of normally closed first and second direction contacts of respective first and second direction relay coils, the first direction relay coil connected to a first direction contact of each pole of the keyswitch and the second direction relay coil connected to a second direction contact of each pole of the keyswitch.

7. A method for checking a keyswitch for an escalator or moving walkway, comprising the steps of:

(1) determining if the keyswitch is out of a normal position and, if not, repeating the first step again and, if so, starting a timing process;

(2) determining if the keyswitch has been out of the normal position for more than a selected period and, if not, determining if it is still out of position and, if not, returning to step (1), but for so long as it is, repeating this step (2) until it has been out of the normal position for more than the selected period; and (3) after it is determined in step (2) that the keyswitch has been out of the normal position for more than the selected period, providing a safety signal for stopping or preventing restarting of the escalator or moving walkway.

8. Apparatus for checking a keyswitch for an escalator or moving walkway, comprising:

a monitoring circuit, responsive to a status signal, for determining if the keyswitch is out of a normal position for more than a selected period for providing a safety signal in the event that it has;

a safety chain circuit, responsive to the safety signal, for providing a permissive signal; and means for operating or moving the escalator or moving walkway, responsive to the permissive signal, for permitting movement of the escalator or moving walkway.

9. The apparatus of claim 8, wherein the monitoring circuit comprises:

an off-delay timer, responsive to a source voltage from a normally closed pole of the keyswitch for providing the safety signal after the source voltage is absent for more than the selected period.

10. The apparatus of claim 8, wherein the monitoring circuit comprises off-delay timer, responsive to a source voltage, connected in series with a pair of up and down contacts wherein the up and down contacts are associated with respective up and down relays connected to normally open poles of a dual pole keyswitch wherein the poles are commonly connected to the source voltage.

* * * * *